United States Patent Office 3,632,707
Patented Jan. 4, 1972

3,632,707
MOLDED FLEXIBLE POLYURETHANE FOAM
Doris Marvin Rice, Austin, Tex., assignor to Jefferson Chemical Company, Inc., Houston, Tex.
No Drawing. Filed Sept. 19, 1969, Ser. No. 859,584
Int. Cl. B29d 27/00; B29h 7/20; C08g 22/36
U.S. Cl. 264—54
5 Claims

ABSTRACT OF THE DISCLOSURE

Molded one shot polyether urethane flexible foams are now possible without employing a high temperature curing step by utilizing a formulation based on polymeric isocyanates and catalyzed by a mixed catalyst made up of trimethylaminoethylpiperazine and dimethylaminoethanol.

BACKGROUND OF THE INVENTION

Field of the invention

This invention relates to the production of molded polyether polyurethane products and, more particularly, to the method of producing a molded one shot flexible polyurethane foam. Molded polyurethane parts are extensively used is the manufacture of seats for automobiles, buses and airplanes as well as for cushions for furniture used in the home and office.

Previously, these molded polyurethane parts were made only with difficulty and long expensive curing steps. There are generally two types of methods for the production of polyurethane foams. A one shot method wherein the reactants, blowing agent and catalyst are all simultaneously mixed and reacted to form the polyurethane foam. The other method is known as the quasi-prepolymer method wherein a portion of the polyether polyol component is reacted with an excess of isocyanate. Then, in a second step the quasi-prepolymer is mixed with the balance of the polyether polyol along with blowing agent and catalyst to produce the polyurethane foam. Previously, when the one shot method was used to make molded foam it was necessary to quickly heat the mold to 300–350° F., usually by infrared or microwave heating, after the mold was charged with the foamable reaction mixture and tightly closed. It was required that the mold remain at that temperature for 10 to 15 minutes in order that sufficient cure could result, allowing the foam to be removed from the mold.

When the quasi-prepolymer molding method is used to make the flexible foam, no such high temperature curing step is necessary; however, the demolding time remained abnormally long, usually from 10 to 15 minutes.

Both of these prior art methods suffer from requiring extra steps in the process and long molding times resulting in significant inefficiency in the practice of the process.

Accordingly, it is an object of my invention to provide a method whereby a one shot molded polyurethane can be produced without resorting to a high temperature curing step.

A further objective of my invention is to provide a polyurethane foam formulation which is suitable for a one shot method of molding polyurethane foams without resorting to a high temperature curing step.

It is a further object of my invention to provide a formulation and a method for producing a molded one shot flexible polyurethane foam which requires a shorter mold time.

Other objects and advantages will be apparent to those skilled in the art from the description and the examples of my invention which follow.

SUMMARY OF THE INVENTION

In the preparation of molded flexible polyurethane products in the practice of my invention, it is necessary to use a rigid mold which will not deform under the pressure of foaming and which is closable so that the foamable polyurethane reaction mixture is not pushed out of the mold during the foaming. In the practice of my invention the mold is preheated to the temperature of about 100° to about 130° F. and a sufficient quantity of a foamable polyurethane reaction mixture is charged which will overfill the mold by about 10% to about 20%. The mold is then closed and the reaction mixture is allowed to foam and cure in the mold, absent any additional heating, for a reaction time of about six to nine minutes. Then the mold is opened and the cured flexible polyurethane foam product is removed.

All components of the foamable polyurethane reaction mixture are simultaneously charged so that the polyurethane product is formed in a one shot reaction product. I have discovered that the reaction mixture comprises polyether polyol component, a polymethylene polyphenyl isocyanate component having a functionality greater than 2.2, a blowing agent and a specific catalyst which is a blend of trimethylaminoethylpiperazine and dimethylaminoethanol.

When these components are used in proportions as hereinafter discussed, a molded flexible polyurethane product is formed which is substantially free of voids, has an open cell structure, has little tendency to shrink, and is quite resilient. The molded product also has a good uniform skin.

A particular advantage to the practice of the process of my invention is that the one shot process is accomplished without the subsequent high temperature curing step necessary in prior art molded flexible foam systems. The cure time of the product is also substantially reduced by the use of my formulation in the practice of my invention.

DESCRIPTION OF THE INVENTION

In the molding of polyurethane products, the reaction mixture is charged to a rigid mold which is sufficiently strong that it will not deform when subjected to the pressure within the mold after the foaming reaction starts. Such a mold can be constructed out of metal or plastic or a combination of both. In the practice of my invention, the mold should be sufficiently strong to withstand the molding pressures and also to be capable of sealing to the extent that the reaction mixture is not pushed from the mold during the foaming process.

The practice of my process involves preheating such a rigid, closable mold to a temperature of about 100° F. to about 130° F. and preferably from 105° F. to about 115° F. While the mold could be preheated to a higher temperature, such heating is not necessary since I have discovered that this range gives sufficient heat to cure the skin of the foam using the formulation hereinafter described and still provide for a short cure time in the mold. Higher mold temperatures may also cause voids in the foam.

To this preheated mold is charged a sufficient quantity of the foamable polyurethane reaction mixture of my invention to overfill the mold by about 10% to about 20%. The term "overfill the mold" means that quantity of the foamable reaction mixture which is greater than the quantity necessary to just fill the mold after the reaction is complete. I use about 10% to about 20% overfill in the practice of my invention. A greater overfill is possible with very strong and tightly closed molds and would tend to increase the density of the foam.

This overfill and tightly closed mold in conjunction with the reaction mixture of my invention all combine to pack the polyurethane foam material and give an improved cell structure substantially free of voids and also an improved skin quality of the resulting product. After the material has foamed, it is allowed to stand in the mold for six to nine minutes, at least six minutes, usually without any further external heat being necessary to cure the product. Of course, the foam product can be cured longer but longer curing is unnecessary. The product is removed from the mold after this short cure time and a flexible polyurethane product is recovered which has a substantially open cell structure, a good skin and is substantially free of any voids in the product.

The above discussed method is much simpler than any of the prior art methods previously used in that the high temperature curing step characteristic of previous one shot molding systems is avoided and the extra reaction step involved in the quasi-prepolymer system is obviated. In both of the prior art processes, the overall mold cycle time is considerably higher than that of the practice of my invention.

In order to practice my invention, it is necessary to use the formulation which I have discovered to be successful in the practice of the described method.

Polyurethane foams are the reaction products of a polyether polyol component and an organic polyisocyanate. The foam is produced by conducting the above reactions catalytically in the presence of water and, optionally an inert blowing agent.

In the one shot process of my invention, the polyether polyol component, the organic polyisocyanate, water and catalyst are all brought together simultaneously and allowed to react, foam and cure in the mold without any additional high temperature curing step.

The polyether polyol component useful for the practice of my invention may be a blend of a polyol having a functionality of from three to about six and an equivalent weight of 1,500 to about 2,200 having about 40% to about 60% primary hydroxyl groups. To this higher functionality material can be blended a polyether diol having a molecular weight from about 3,000 to about 5,000 in such proportions that there is 0 to about 40 wt. percent of the diol and correspondingly about 60 to 100 wt. percent of the higher functionality material.

It is particularly preferred, however, that the polyether polyol be a triol having about 4,500 to about 6,500 molecular weight and from about 40% to about 60% primary hydroxyl groups. As stated above, this triol may be used alone or in a mixture with the aforesaid polyether diols.

The polyether polyols useful in the practice of my invention are prepared by a well known process which involves the reaction of the polyhydric initiator such as trimethylolpropane, glycerol, 1,2,6-hexane triol, sorbitol, pentaerythritol, and the like, with a lower alkylene oxide such as propylene oxide and butylene oxide, mixtures thereof, or mixtures of ethylene oxide with propylene oxide and/or butylene oxide. This reaction is carried out in a well known manner with an alkoxylation catalyst, generally an alkali metal hydroxide such as potassium hydroxide. The reaction is continued until the product of an approximate desired molecular weight is obtained. It is necessary to then react the product made as described above with ethylene oxide in order to acquire primary hydroxyl group termination of the polyether chains. This process is described in U.S. Pat. 3,336,242 for example. The percentage of primary hydroxyl group terminating the polyether chain is generally increased by an addition of ethylene oxide alone; however, it will be understood that ethylene oxide mixed with some proportions of propylene oxide will also achieve this result. Also, it is within the scope of my invention to use a polyether polyol which may have blocked segments of different alkylene oxides in the molecule and not solely limiting such segments of ethylene oxide to the terminal positions.

While higher functionality polyether polyols may be used, it is especially preferred to use triols having molecular weights of 4,500 to about 6,500 and about 50% primary hydroxyl groups. Although triols having molecular weights of 3,000 to about 4,500 can be used to produce a flexible polyurethane foam, it has been found that the molded foam produced has significantly more closed cells and the foams themselves are not as resilient.

Useful polyether diols are, for example, polypropylene glycols or mixed polypropylene glycol-polyethylene glycol copolymers having a molecular weight from about 3,000 to about 5,000. These materials are produced by reacting ethylene oxide, propylene oxide, or a butylene oxide either sequentially or in admixture with an intiator such as, for example, ethylene glycol, propylene glycol or butylene glycol.

The organic polyisocyanates useful in the practice of my invention are those prepared by the phosgenation of the reaction product between aniline and formaldehyde having a functionality of 2.2 or greater. While functionalities around four and above are possible, they are not readily attainable by known processes. It is preferred to use isocyanates having functionalities of about 2.2 to about 3.5 and an especially preferred range is between 2.2 and 2.8. Isocyanates are produced by phosgenating amine precursors formed in the process described in U.S. Pats. 2,683,730 and 3,362,979, for example.

The polyol component and the organic isocyanate component are mixed in the reaction mixture in such proportions that the ratio of isocyanato groups to hydroxyl groups, commonly known as isocyanate index, is from 0.95 to about 1.15 with an especially preferred isocyanate index being about 1.05. The ratio of isocyanato groups to hydroxyl groups includes also any water that is present in the foamable reaction mixture.

Water is used to produce the blowing agent and/or adjust the density of the foam in the practice of my invention. It is preferred to use one to about four parts by weight of water per 100 parts of the polyol component and I have found that best results are obtained when the water range is from about 1.5 to about 2.5 parts by weight per 100 parts of the polyol component. In addition to utilizing water to produce the blowing agent, other well known inert blowing agents as described in U.S. Pat. 3,072,528 may be used to produce the foam in conjunction with the water blowing agent. This supplementary blowing agent would be used to adjust the density of the resulting product. When such a supplemental blowing agent is used in this system, it is present in the concentration of up to about 15 parts by weight and preferably from one to about 10 parts by weight. Examples of preferred blowing agents are trichlorofluoroethane, dichlorofluoromethane, propane, methylenechloride and the like.

In the practice of my invention, in order to make an open-celled, flexible polyurethane foam, the foamable reaction mixture does not contain a surfactant such as silicone oils which are often used in polyurethane blends. However, up to 0.2 part by weight might be tolerated without significantly damaging the resulting product. Higher amounts will tend to cause a closed cell structure of the resulting flexible polyurethane foam product.

While there are many catalysts of urethane formation well known to those skilled in the art, I have discovered that the catalyst system used is critical to the successful practice of my invention. It is known to use organo-metallic catalyst either alone or in admixture with tertiary amine catalyst. It is also known to combine several tertiary amine catalysts to initiate a polyurethane foam reaction. However, I have discovered that a single combination of two tertiary amine catalysts have special significance and perform satisfactorily in my invention to the exclusion of other tertiary amine catalysts either in combination or alone. In the practice of my invention, the foamable reaction mixture is mixed in the presence of trimethylaminoethylpiperazine and dimethylethanolamine. The formulation will contain about 0.5 to about 1.5 parts by weight per 100 parts of polyol component of trimethylaminoethylpiperazine and about 0.5 to about 1.0 part by weight per 100 parts of polyol component of the dimethylethanolamine. The material trimethylaminoethylpiperazine can be represented by the formula:

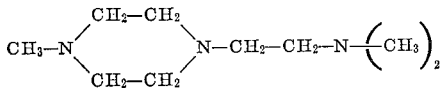

As will be seen by the accompanying examples, other amine catalysts known in the polyurethane art were also attempted but resulted in the formation of unsatisfactory polyurethane products.

The use of the formulation of my invention in the method of my invention will be further illustrated by the following examples which are for purposes of illustration and it should not be considered to limit the scope of my invention.

In the following examples the values for the foam properties were determined by the art-accepted, well recognized tests and procedures as set forth in ASTM-1564.

EXAMPLE I

The following materials were charged into a low pressure foam machine in the following proportions:

Stream 1: P.b.w.
Polyol (6,500 molecular weight triol having 50% primary hydroxyl) _____ 100
Stream 2:
Water _____ 1.5
Dimethylaminoethanol (DME) _____ 0.5
Trimethylaminoethylpiperazine (TAP) _____ 0.7
Stream 3:
MONDUR MRS (polymethylenepolyphenylisocyanate having a functionality of 2.8) _____ 29.7

The temperature of stream 1 was adjusted to 80° F. and the temperature of stream 3 was adjusted to 100° F. to provide optimum mixing. The ratio of the equivalents of isocyanate to hydroxyl (including water) was 1.05 (isocyanate index). The formulation was poured into a 15-inch x 15-inch x 2-inch mold constructed of aluminum which was preheated to 105–110° F. Enough material was used to obtain an approximate 10–20% overfill. The resulting foam had a good skin and no noticeable voids. It had little tendency to shrink indicating an open cell structure.

EXAMPLE 2

The formulation used in Example 1 was run under exactly the same conditions except that 1.0 part by weight of triethylenediamine was used instead of the catalyst combination of Example 1. The resulting foam had a considerable number of closed cells and had a strong tendency to shrink.

EXAMPLE 3

The formulation used in Example 1 was run under exactly the same conditions except that the catalyst combination was replaced by 0.5 part by weight of triethylenediamine. The resulting molded piece had a noticeable void at the bottom of the foam.

EXAMPLE 4A

The following formulation was run on a low pressure foam machine as in Example 1:

Parts by weight
Polyol of Example 1 _____ 100
Water _____ 2.0
TAP (Trimethylaminoethylpiperazine) _____ 1.0
DME (Dimethylaminoethanol) _____ 0.5
Polymethylenepolyphenylisocyanate ($f=2.8$) _____ 38.3
Isocyanate index _____ 1.05

An approximate 20% overfill, 520 grams of the reaction mixture, was poured into a 15-inch x 15-inch x 2-inch aluminum mold preheated to 105–110° F. The mold lid was loose, allowing it to shift upward under the molding pressure. When the foam was released in nine minutes, it contained voids at the bottom and corners.

EXAMPLE 4B

Example 4A was repeated under exactly the same conditions, except that the mold lid was tightly clamped so that it could not yield under the molding pressure. The resulting molded foam, released in approximately nine minutes, contained no voids and was a completely acceptable molded part. The molded foam had the following properties: density, 5.2 p.c.f.; 25% Indentation Load Deflection (ILD), 33; 65% ILD, 97; 50% compression set, 11%; tensile, 11 p.s.i.; elongation, 70%; tear, 0.6 p.l.i.; and ball rebound, 60%. The foam had a high ratio of 65% ILD to 25% ILD and a high ball rebound giving it a very luxurious feel.

The above formulation was also poured into a complicated bucket seat mold which is a stringent test for a foam's moldability. A good molded part was obtained at a 1.05 index if the mold lid were clamped so that it would not give under the molding pressure and allow very little excess material to escape the mold.

EXAMPLE 5

The formulation and method of Example 4B was repeated except that the quantity of the polymethylenepolyphenylisocyanate was varied to give an isocyanate index of 0.95, 1.05 and 1.15. The foams produced had the following properties:

| Isocyanate index | 0.95 | 1.05 | 1.15 |
|---|---|---|---|
| Parts by weight isocyanate | 34.7 | 38.3 | 41.9 |
| Foam properties: | | | |
| Density | 5.5 | 5.2 | 5.0 |
| 2″ ILD: | | | |
| 25% | 31 | 33 | 40 |
| 65% | 85 | 97 | 114 |
| 25% (R) | 26 | 30 | 35 |
| Compression set: | | | |
| 50% | 8.4 | 11.1 | 8.7 |
| 90% | 6.6 | 7.1 | 5.5 |
| Tensile, p.s.i. | 8.0 | 11.1 | 11.3 |
| Elongation, percent | 85 | 70 | 75 |
| Tear, p.l.i. | 0.46 | 0.60 | 0.70 |
| Ball rebound, percent | 58 | 60 | 60 |

At increasing isocyanate index the molded density decreased from 5.5 to 5.0 p.c.f., and the 25% ILD increased from 31 to 40. Although good molded parts could be prepared at all three isocyanate indices, the best parts were obtained at a 1.05 index.

The property, "ILD, 25% (R)" indicates the 25% ILD when run a second time immediately after running the 65% ILD. The ratio of the 25% ILD (R) and the initial 28% ILD indicates the loss due to a hysteresis effect in the foam. The lower this loss, the better the foam for use as a cushion. This example demonstrates that the foams of my invention are well suited for use as molded seat cushions.

EXAMPLE 6

This example demonstrates the use of an additive blowing agent in conjunction with water.

The following formulation was molded under the same conditions as in Example 4B: polyol of Example 1, 100 p.b.w.; water, 2.0 p.b.w., TAP, 0.75 p.b.w.; DME, 0.5 p.b.w., fluorocarbon-11 (trichlorofluoromethane), 10 p.b.w.; and polymethylenepolyphenylisocyanate having a functionality of 2.6, 38.3 p.b.w. Isocyanate index was 1.05. The resulting molded foam had the following properties: density, 3.8 p.c.f.; 25% ILD, 16; 65% ILD, 48; 50% compression set, 8.8; tensile, 7.8 p.s.i.; elongation, 80%, tear, 0.5 p.l.i.; and ball rebound, 61%. The square molded piece was a uniform foam having no voids.

EXAMPLE 7

The following formulation was molded under the same conditions as in Example 4B: polyol of Example 1, 100 p.b.w.; water, 3.0 p.b.w.; TAP, 0.5 p.b.w.; DME, 0.5 p.b.w.; and polymethylenepolyphenylisocyanate of Example 1, 54 p.b.w. The isocyanate index was 1.05. The resulting molded foam had the following physical properties: density, 3.9 p.c.f.; 25% ILD, 49; 65% ILD, 157; 50% compression set, 11%; tensile, 20 p.s.i.; elongation, 128%; tear, 0.7; and ball rebound, 52%. The square molded piece had no voids.

EXAMPLE 8

The following formulation was molded under the same conditions as in Example 4B: polyol of Example 1, 100 p.b.w.; water, 2.0 p.b.w.; TAP, 1.0 p.b.w.; DME, 0.5 p.b.w.; and polymethylenepolyphenylisocyanate having a functionality of 2.3, 37.5 p.b.w. The isocyanate index was 1.05. The resulting molded foam had the following properties: density, 4.7 p.c.f.; 25% ILD, 37; 65% ILD, 99; tear, 1.0 p.l.i.; and ball rebound, 51%. The square molded piece had no voids.

EXAMPLE 9

The following formulation was molded under the same conditions as outlined in Example 4B: triol having 4,500 molecular weight and 50% primary hydroxyl, 100 p.b.w.; water, 2.0 p.b.w.; TAP, 1.0 p.b.w.; DME, 0.5 p.b.w.; and polymethylenepolyphenylisocyanate of Example 1, 45.6 p.b.w. The resulting molded foams had the following physical properties: density 5.8 p.c.f.; 25% ILD, 69; 65% ILD, 202; 50% compression set, 7.9%; tensile, 12.5 p.s.i.; elongation, 63%; tear, 0.45 p.l.i.; and ball rebound, 50%. The resulting molded foam was somewhat tighter than those using the higher molecular weight polyol but it still contained no voids.

What is claimed is:
1. A method for preparing a molded flexible polyurethane product which comprises the steps of
   (a) heating a rigid, closable mold to a temperature of from about 105° to about 115° F.;
   (b) charging to said mold a sufficient quantity of a foamable polyurethane reaction mixture to overfill the mold by about 10% to about 20% wherein said reaction mixture consists essentially of:
      (i) a polyether triol having a molecular weight of about 4,500 to about 6,500 and a primary hydroxyl content of about 40% to about 60%;
      (ii) a polymethylenepolyphenylisocyanate having a functionality from 2.2 to about 3.5 in sufficient quantity with respect to hydroxyl groups present in the triol and water to produce an isocyanate index of from about 0.95 to about 1.15;
      (iii) water in the amount of from about one to about four parts by weight per 100 parts by weight of the triol;
      (iv) as a catalyst, a mixture consisting of about 0.5 to about 1.5 parts by weight of trimethylaminoethylpiperazine per 100 parts by weight of triol and about 0.5 to about 1.0 parts by weight of dimethylaminoethanol per 100 parts by weight triol;
   (c) closing said mold and allowing said reaction mixture to foam and cure in the mold absent additional heating; and
   (d) removing from said mold a cured flexible polyurethane foam product.

2. The method of claim 1 wherein a supplemental blowing agent is present in an amount up to 15 parts by weight per 100 parts triol.

3. The method of claim 1 wherein the isocyanate has a functionality of from 2.2 to about 2.8.

4. The method of claim 1 wherein the isocyanate index is about 1.05.

5. The method for preparing a molded flexible polyurethane product which comprises the steps of
   (a) preheating a rigid, closable mold to a temperature of about 100 to 130° F.;
   (b) charging to said mold a sufficient quantity of a foamable polyurethane reaction mixture to overfill the mold by about 10% to about 20% wherein said reaction mixture consists essentially of:
      (i) a polyether polyol component containing about 60 to 100 wt. percent of a polyether polyol having from three to six hydroxyl groups and having an equivalent weight of about 1,500 to about 2,200 and a primary hydroxyl content of about 40% to about 60%, and, correspondingly, about 40 to 0 wt. percent of a polyether diol having a molecular weight of from about 3,000 to about 5,000;
      (ii) a polymethylenepolypheneylisocyanate having a functionality greater than 2.2 in an amount such that an isocyanate index of from about 0.95 to about 1.15 is produced;
      (iii) water; and
      (iv) as a catalyst, 0.5 to about 1.5 parts by weight of trimethylaminoethylpiperazine and 0.5 to about 1.0 part by weight of dimethylaminoethanol per 100 parts by weight of polyol;
   (c) closing said mold and allowing the reaction mixture to foam and cure in the mold absent additional heating; and
   (d) removing from said mold a cured flexible polyurethane foam product.

References Cited

UNITED STATES PATENTS 3,372,130  3/1968  Chess et al. _____ 260—2.5
2,949,431  8/1960  Britain _____ 260—75 X

FOREIGN PATENTS 720,450  10/1965  Canada _____ 260—2.5

DONALD E. CZAJA, Primary Examiner

C. W. IVY, Assistant Examiner

U.S. Cl. X.R.

260—2.5 AC, 2.5 AZ, 2.5 AP